US007805243B2

(12) United States Patent
Gasbarro et al.

(10) Patent No.: US 7,805,243 B2
(45) Date of Patent: *Sep. 28, 2010

(54) PERSONAL DIGITAL ASSISTANT HAVING SATELLITE COMMUNICATIONS CAPACITY

(75) Inventors: Henry Frank Gasbarro, Marina del Ray, CA (US); Joseph Edwin Carpenter, Long Beach, CA (US); Robert R. Berry, Glendora, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 2005 days.

This patent is subject to a terminal disclaimer.

(21) Appl. No.: 10/634,535

(22) Filed: Aug. 5, 2003

(65) Prior Publication Data

US 2005/0032525 A1    Feb. 10, 2005

(51) Int. Cl.
*G06F 1/16* (2006.01)
(52) U.S. Cl. .................. 701/213; 701/208; 361/679.56; 342/357.01; 342/357.09
(58) Field of Classification Search ............... 701/213, 701/208, 215, 300; 340/993; 455/456.6; 342/357.09; 361/379.56
See application file for complete search history.

(56) References Cited

U.S. PATENT DOCUMENTS

| 5,151,047 | A | * | 9/1992 | Phillips | 439/333 |
| 5,160,807 | A | * | 11/1992 | Fry et al. | 174/387 |
| 5,294,826 | A | * | 3/1994 | Marcantonio et al. | 257/659 |
| 5,410,141 | A | * | 4/1995 | Koenck et al. | 235/472.02 |
| 5,548,822 | A |   | 8/1996 | Yogo |   |
| 5,628,055 | A | * | 5/1997 | Stein | 455/575.1 |
| 5,724,234 | A | * | 3/1998 | Phelps | 361/816 |
| 5,838,551 | A | * | 11/1998 | Chan | 361/818 |
| 5,905,947 | A | * | 5/1999 | Stein | 455/90.3 |

(Continued)

FOREIGN PATENT DOCUMENTS

EP    0 817 152 A1    1/1998

(Continued)

OTHER PUBLICATIONS

Bielby, Robert,"Xilinx High-Volume Prgrammable Logic Applications in Satellite Modem Desings". Jul. 21, 2000, Xilinx, WP120(v1.0) pp. 1-6.*

(Continued)

*Primary Examiner*—Khoi Tran
*Assistant Examiner*—Brian J Broadhead
(74) *Attorney, Agent, or Firm*—Tarolli, Sundheim, Covell & Tumminoi LLP

(57) ABSTRACT

Systems and methods are disclosed for utilizing personal digital assistants in a portable communications system. A personal digital assistant includes a global positioning system module, an L-band transceiver, and a processing system. The global positioning system module produces location information associated with the position of the personal digital assistant. The L-band transceiver broadcasts the location information to a network of at least one other personal digital assistant and receives location information from at least one other personal digital assistant within the network via a communications satellite. The processing system provides messages to the L-band transceiver and updates a display associated with the personal digital assistant according the received location information and the location information produced at the global positioning system module.

11 Claims, 13 Drawing Sheets

U.S. PATENT DOCUMENTS

| | | | |
|---|---|---|---|
| 5,963,872 A * | 10/1999 | Stein | 455/557 |
| 6,104,620 A * | 8/2000 | Dudas et al. | 361/800 |
| 6,148,261 A * | 11/2000 | Obradovich et al. | 701/208 |
| 6,374,245 B1 | 4/2002 | Park | 707/10 |
| 6,411,899 B2 | 6/2002 | Dussell et al. | 701/211 |
| 6,421,028 B1 * | 7/2002 | Ohgren et al. | 343/895 |
| 6,434,403 B1 | 8/2002 | Ausems et al. | 455/556 |
| 6,492,941 B1 | 12/2002 | Beason et al. | |
| 6,560,468 B1 | 5/2003 | Boesen | 455/568 |
| 6,640,084 B2 * | 10/2003 | Pande et al. | 455/3.01 |
| 6,742,037 B1 * | 5/2004 | Hall et al. | 709/228 |
| 6,826,405 B2 * | 11/2004 | Doviak et al. | 455/445 |
| 6,889,135 B2 * | 5/2005 | Curatolo et al. | 701/207 |
| 2001/0044321 A1 | 11/2001 | Ausems et al. | 455/556 |
| 2002/0046259 A1 | 4/2002 | Glorikian | 709/218 |
| 2002/0055368 A1 | 5/2002 | Lee | 455/556 |
| 2002/0077067 A1 * | 6/2002 | Lochner et al. | 455/73 |
| 2002/0080966 A1 * | 6/2002 | Blanchard et al. | 380/270 |
| 2002/0169000 A1 | 11/2002 | King | 455/556 |
| 2002/0177465 A1 * | 11/2002 | Robinett | 455/552 |
| 2003/0017646 A1 * | 1/2003 | Sridharan et al. | 438/106 |
| 2003/0018852 A1 * | 1/2003 | McLinn | 711/115 |
| 2003/0032426 A1 * | 2/2003 | Gilbert et al. | 455/427 |
| 2003/0032449 A1 | 2/2003 | Giobbi | 455/556 |
| 2003/0054762 A1 | 3/2003 | Karabinis | 455/12.1 |
| 2004/0138812 A1 * | 7/2004 | Cho | 701/213 |
| 2004/0165369 A1 * | 8/2004 | Lionetta et al. | 361/818 |
| 2004/0252051 A1 * | 12/2004 | Johnson | 342/357.09 |
| 2005/0114553 A1 * | 5/2005 | Lada et al. | 710/1 |
| 2006/0241865 A1 * | 10/2006 | Smith | 702/3 |

FOREIGN PATENT DOCUMENTS

| | | |
|---|---|---|
| EP | 1 148 754 A3 | 4/2002 |
| EP | 1 261 221 A1 | 11/2002 |
| EP | 1 162 474 A3 | 12/2002 |
| WO | WO 97/14048 | 4/1997 |
| WO | WO 00/67397 | 11/2000 |
| WO | WO 02/063327 A3 | 8/2002 |
| WO | WO 03/026143 A3 | 3/2003 |

OTHER PUBLICATIONS

Qualcomm, "GSP-1600 Tri-Mode Phone User Guide", 2001, p. 40.*

Globalstar, "Globalstar Introduces Internet Access on Satellite Network", Dec. 2000 pp. 1-3.*

Search Report for GB 0417169.0 filed Aug. 2, 2004, Dated of Search Jan. 18, 2005, conducted for claims 1-16, 19-24.

* cited by examiner

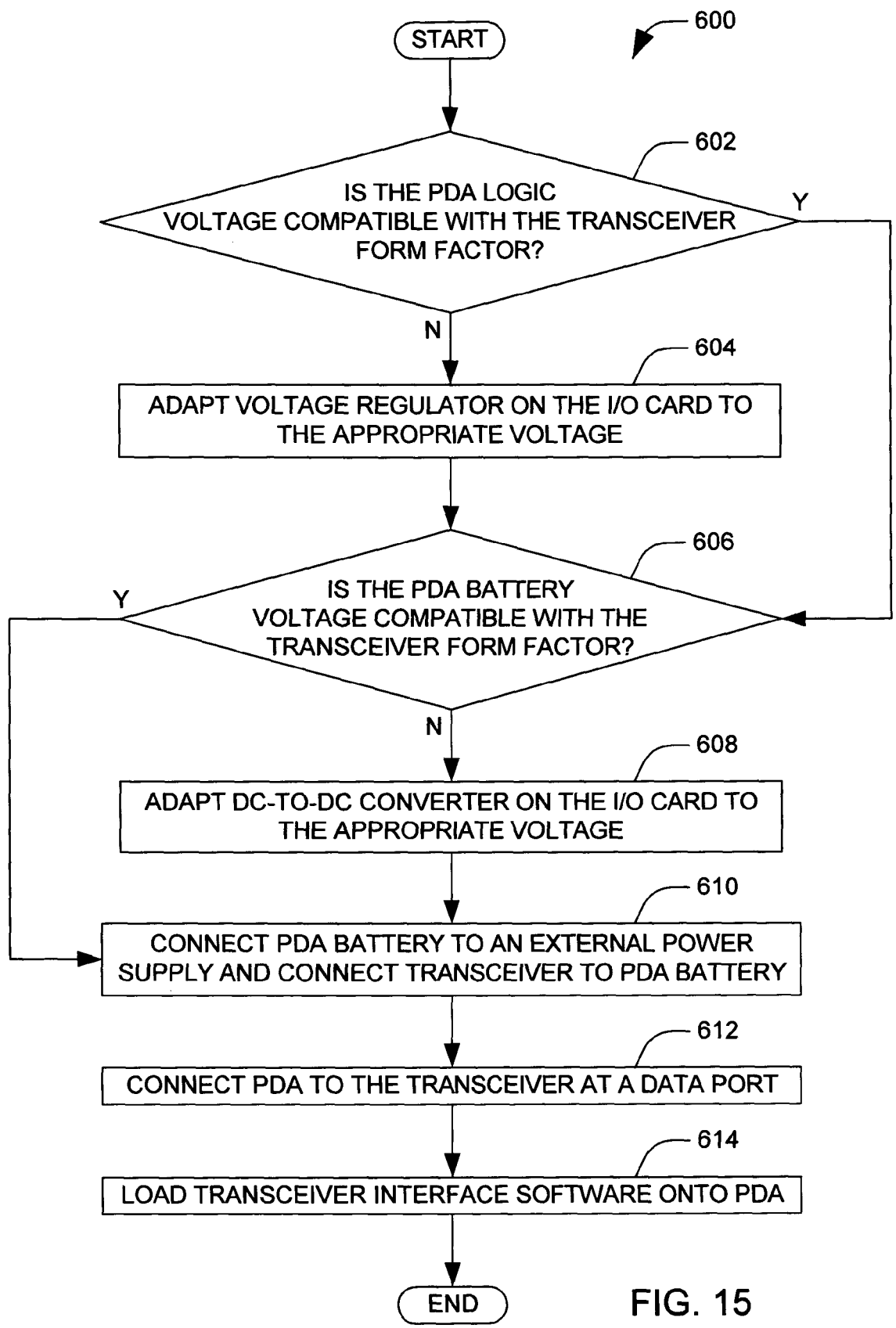

PERSONAL DIGITAL ASSISTANT HAVING SATELLITE COMMUNICATIONS CAPACITY

CROSS REFERENCE TO RELATED APPLICATIONS

The present application is related to New Gasbarro U.S. Patent Application entitled "Dismount Tablet Computer Assembly For Wireless Communication Applications", Filed Aug. 5, 2003, Ser. No. 10/634,295, assigned to the same assignee as the present application.

TECHNICAL FIELD

This invention relates to the field of communications systems, specifically the field of portable communications devices.

BACKGROUND OF THE INVENTION

The use of communication systems having wireless mobile communication units has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility because the units do not have to be connected to a fixed wired network. These and other favorable characteristics make wireless communications ideally suited for personal, business, military, search and rescue, law enforcement, water vehicle, and other field related applications.

In some applications, it is desirable to maintain consistent periodic communication with one or more other communications units. Such consistent communications are useful in situations have a risk of incapacitation of the user, such as battlefield applications, recreational activities in rugged environments, or civilian search and rescue operations. If the periodic communications from the user cease, a search can be carried out at the last reported location. A variation on this theme could include an automated communications unit that periodically broadcasts a signal to other communication units, such that the signal itself can be employed to locate the user.

If an area is equipped with robust communications infrastructures (e.g., cell towers), there are relatively easy ways to establish and maintain such wireless communications to mobile users, by making use of the infrastructure. However, there are some endeavors where it is necessary to provide such a wireless communications capability even while in an area that does not have such a communications infrastructure, and in such cases it is much more difficult to establish and maintain such wireless communications to mobile users.

Even in areas without such a robust wireless communications infrastructure, there are techniques that have been developed to enable the mobile members of a team to establish and maintain digital communications . . . as long as there are cars, trucks, helicopters, or other similar vehicles available for each user, providing the benefit of large antennas and a large power supply. For example, it is presently required that military vehicles possess the capability to send periodic communications to other military units when active. The availability of large antenna masts, and relatively large amounts of electrical power (from the vehicles alternator, etc.) have permitted feasible implementations based on netted line-of-sight radios, and netted line-of-sight radios combined with satellite data terminals designed for on-the-move operations.

Existing communications systems to and from individual users on a battlefield that are not in or near a vehicle (the military terms these "dismounted" soldiers), however, have suffered from severe technical limitations that impede and degrade tactical operations in significant ways. Existing problem areas include battery life, heat dispersion, electromagnetic interference between closely packed radio frequency components, range, safety, weight, complexity of operation, setup and configuration time, and missing functionality. Similar problems plague electronic communications to small mobile teams in other domains, such as search-and-rescue teams, and law enforcement agents in the field. In some real sense, most of these problem areas derive from the issue of battery life; the severe limitations on battery capacity limit the transmit power, which in turn limits communications range. The same sever limitations on battery capacity also limit the transmit duty cycle (e.g., the duration or percentage of time which a transmitter can be on and transmitting), preventing an individual not in a vehicle from communicating continuously without either receiving new batteries or having access to a battery charger for appropriate mission durations. Current implementations are so inefficient that to carry spare batteries for an entire week's worth of mission would be infeasible.

The fundamental problem with current implementations involves limitations in the present art of how electronic communications are implemented for such teams. Weight, size, and battery life are significant design drivers for how a communications device carried by an individual (e.g., in the hand, in a backpack, or attached to the body by some other means, such as slung from the belt) is designed and implemented. This problem is compounded by the fact that the very applications where dismount communications are most useful are those where the weight and size of the communication device are of the most concern. Most current art uses cell phones or single-channel radios with "push-to-talk" channel access for dismounted users. Cell phones clearly will not work in locations where there are no cell towers. Satellite cell phones achieve only very short battery life. Single-channel radios suffice for occasional communications, but cannot maintain the periodic communication required by the applications discussed above at any significant range.

BRIEF DESCRIPTION OF THE DRAWINGS

FIG. 15 illustrates an exemplary methodology for adapting a personal digital assistant to a form factor associated with a particular transceiver module in accordance with one or more aspects of the present invention.

SUMMARY OF THE INVENTION

Figure 1:
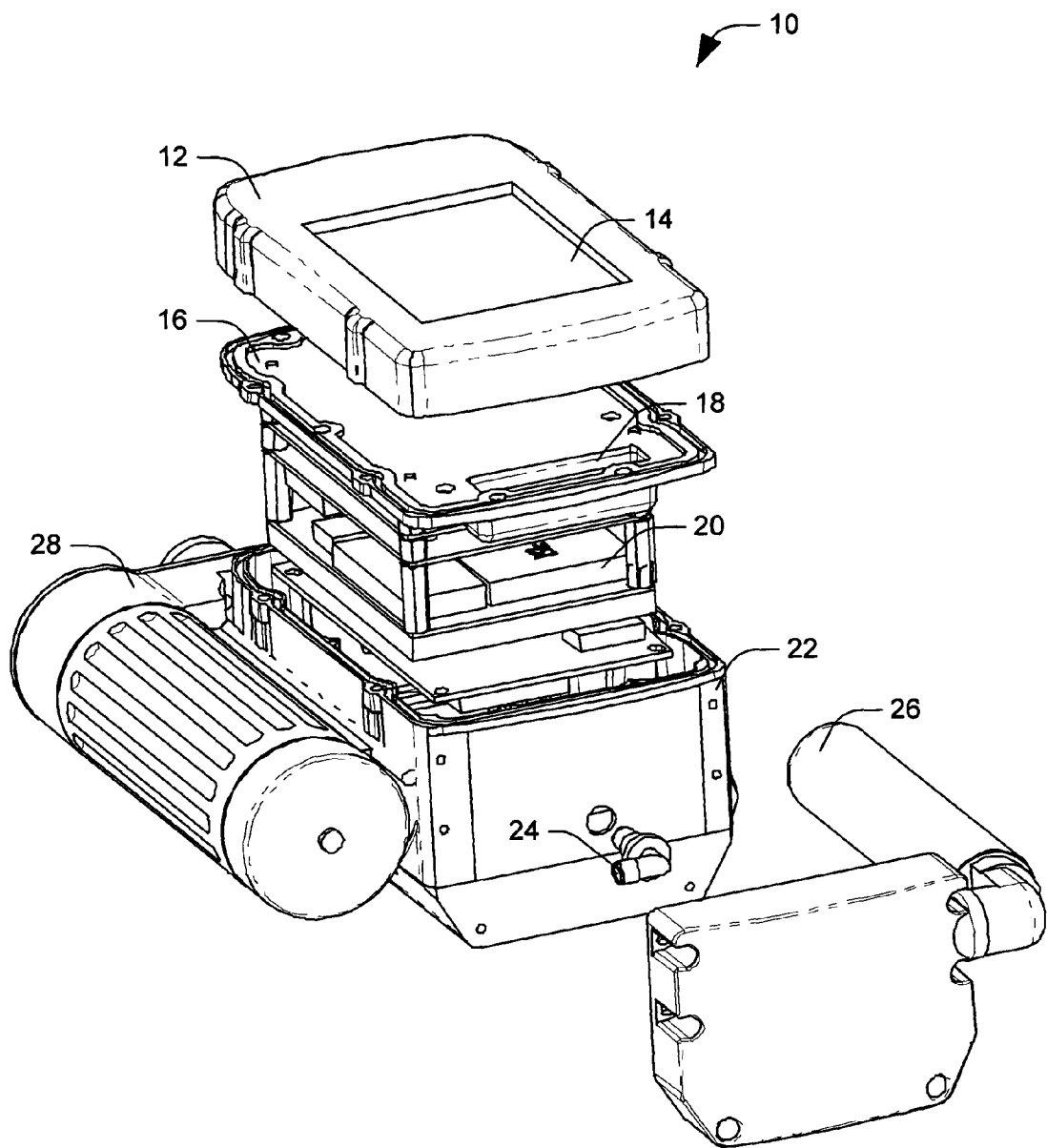
FIG. 1 illustrates an exploded view of a personal digital assistant assembly in accordance with an aspect of the present invention.

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

In accordance with an aspect of the invention, a personal digital assistant is provided. The personal digital assistant includes a global positioning system module, an L-band satellite transceiver, and a computer processing system. The global positioning system module produces location information associated with the position of the personal digital assistant. The L-band transceiver broadcasts the location information to a network of at least one other personal digital assistant and receives location information from at least one other personal digital assistant within the network via a communications satellite. The processing system provides messages to the L-band transceiver, and updates a display associated with the personal digital assistant according the received information, and the location information produced by the global positioning system module.

In accordance with another aspect of the present invention, a method is presented for updating location information at a personal digital assistant via a battlefield tactical communications network. The location of the personal digital assistant is determined at regular intervals via a global positioning system. The determined location is broadcast on an L-band frequency via a satellite relay to at least one other personal digital assistant on the network. Location information is received from at least one other personal digital assistant on the network on an L-band frequency via a satellite relay. The determined location and the received location information are displayed on a display associated with the personal digital assistant.

In accordance with yet another aspect of the present invention, a portable communications device is disclosed. The portable communications device includes a communications module and a personal digital assistant. The communications module comprises a global positioning system and an L-band transceiver. The global positioning system determines the location of the device relative to a standard set of coordinates. The L-band transceiver broadcasts the determined location at a frequency within the L-band of the electromagnetic spectrum and receives location data for at least one other communications system. The communications module receives control signals from the personal digital assistant, which provides a user interface with the communications module and displays the determined location and the received location data.

In accordance with still another aspect of the present invention, a method is presented for adapting a personal digital assistant to operate in conjunction with a transceiver module having a predetermined form factor. At least one logic connection is provided through a data port on the personal digital assistant to provide programmable logic signals to the transceiver. A connection is provided to a battery associated with the personal digital assistant to provide an operating voltage for the transceiver module. The received programmable logic signals and operating voltage within the transceiver are adapted according to the predetermined form factor of the transceiver. Interface software is loaded into the transceiver such that the personal digital assistant can drive the transceiver module to periodically transmit location information associated with the transceiver module.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to devices and methods for utilizing one or more personal digital assistants (PDAs) in a communications network. The personal digital assistants incorporate L-band transceivers and GPS modules to allow automated communication of position data between the plurality of PDAs and one or more other compatible communications devices, which can include mobile and stationary data processing devices. The PDA's can further include custom software and one or more antennas. Each PDA can contain within a memory geographic information and appropriate software for viewing and manipulating the position data and the geographic information. The PDA software can also include the capacity for broadcasting text messages, either with or without position data associated with the PDA. These messages can include preset messages, such as a request for supporting fire or a hazardous materials warning, or they can simply be a free-text message composed on a touchscreen keyboard. Efficiencies gained by packaging, message representation schemes, software, combined GPS/L-band satellite antenna, and system-level power management, including automatic GPS power cycling combine to achieve a level of battery life that makes this device feasible and useful, and distinguishes it from all previous implementations.

FIG. 1 illustrates a personal digital assistant (PDA) 10 incorporating an L-band transceiver and a global positioning system in accordance with an aspect of the present invention. A control module 12 comprises a processor (not shown) and a display 14. In an exemplary embodiment, the control module is a commercially available PDA, with various protective measures included to allow the PDA to withstand extreme conditions. The control module 12 is fitted with a back plate 16. This back plate 16 includes data ports and power opening 18 to allow communication between a circuit board stack 20 and the control module 12. The back plate 16 comprises one wall of a Faraday cage 22 intended to protect the board stack 20 from electromagnetic interference. The Faraday cage 22 further serves as a heat sink to redirect heat from the board stack 20 away from the control module 12.

The board stack 20 comprises an L-band transceiver and a global position system (GPS) module. The control module 12 is operatively connected to the L-band transceiver and the GPS module, such that the control module 12 can submit commands to digital control circuitry within the board stack 20 to control the operation of the GPS module and the L-band transceiver. In an exemplary embodiment, the board stack 20 further comprises an input/output board that regulates the data connection between the control module 12 and the board stack 20.

A single antenna mount 24 operatively connected to the board stack 20 extends through the Faraday cage 22. The antenna mount 24 includes a connector designed to mate with an opposing connector on a detachable antenna 26. The antenna mount 24 allows signals to pass between the antenna 26 and the L-band transceiver or the GPS module within the board stack 20. The antenna 26 is designed to allow the transmission and reception of signals at L-band and GPS frequencies to one or more satellite relays, and to receive transmissions on both the L-band and the various GPS frequencies (e.g., L1 and L2). When the antenna 26 is separated from the PDA 10, both the antenna and the PDA are of a sufficiently small size as to be placed in a pocket and be carried on the person. In an exemplary embodiment, the antenna 26 is a quadrifilar helix antenna.

An external battery 28 powers the PDA 10. The external battery 28 is operatively connected to an internal battery (not shown) within the control module 12 providing extended battery life for the PDA 10. The external battery 28 also provides a power supply for the board stack 20, either directly or through the internal battery in the control module 12. In an exemplary embodiment, power is supplied to the board stack 20 through the control module 12, and the voltage provided from the PDA is adjusted at an input/output board within the board stack to meet the needs of the GPS module and the transceiver module.

Figure 2:
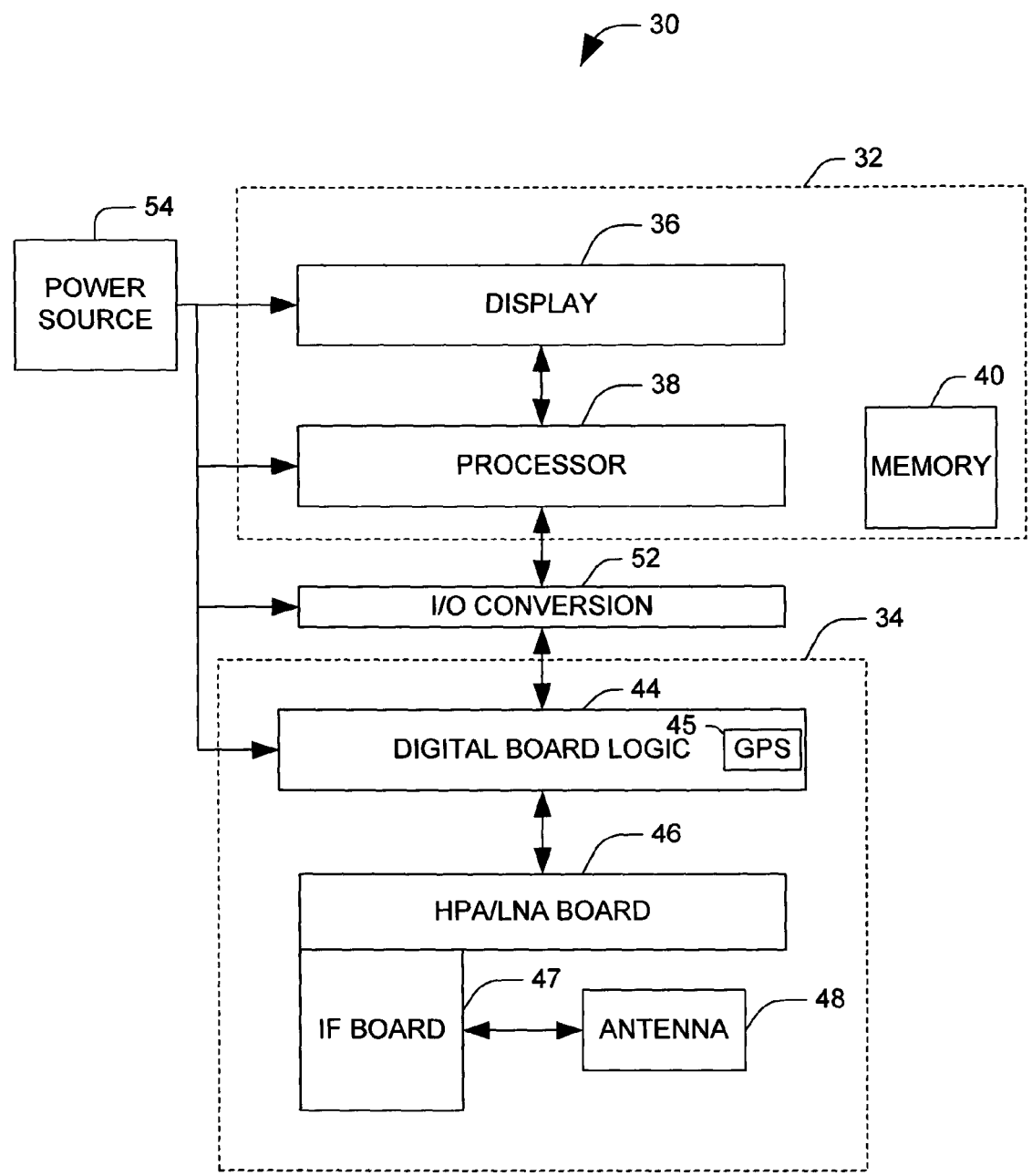
FIG. 2 illustrates a block diagram of an exemplary personal digital assistant in accordance with an aspect of the present invention.

FIG. 2 illustrates a block diagram of an exemplary personal digital assistant 30 in accordance with one aspect of the present invention. The illustrated personal digital assistant 30 includes a control module 32 that is operatively connected to a communications module 34. The control module 32 includes a display 36 that provides received messages and other data to a user. The display 36 can include touchscreen capabilities to double as an input device for the user. Alternatively, one or more input ports (not shown) can be provided for incorporating peripheral input devices, such as a miniature keyboard, a mouse, a microphone, or any of a number of other suitable devices for inputting commands.

The control module 32 further includes a processor 38 that processes user input and messages received at the communications module 34. The processor 38 produces messages for broadcast at the communications module 34 in response to user input. For example, the input device can allow the user to select one of a plurality of predetermined messages. In one embodiment, the user may also enter free text messages via a miniature keyboard or touchscreen. The personal digital assistant 30 can further include integrated microphone, speaker capability, and a Secure Digital (SD) Flash Card. The processor 38 will also process messages received at the communications module to provide information to the user at the display 36.

The processor 38 is operatively connected to a memory 40. The memory 40 can comprise any of a number of data storage mediums known in the art. In an exemplary implementation, the memory 40 comprises a block of flash read-only memory (ROM) and a block of working memory synchronous dynamic random access memory (SDRAM). In an exemplary implementation, the working memory comprises one or more flash ROM chips, each operative to quickly record and erase blocks of data. Basic software, such as an operating system and any necessary drivers, are encoded in the ROM memory.

The working memory logs messages received at the communications module 34 and can contain other data necessary for a particular system task. In an exemplary implementation, the working memory can contain geographic information concerning a particular area and the known locations of terrain features, friendly figures, and enemy figures. The contents of the working memory can be changed during system operation or by inputting additional data through the one or more input devices. For example, the system can contain a memory card reader that accesses data from a memory card and provides it to the working memory.

The communications module 34 comprises a digital logic board 44, an IF board 46, an amplifier board set assembly 47 comprising a high power amplifier and a low noise amplifier (HPA/LNA), and an antenna 48. The digital logic board 44 provides a control function for the communications module 34. For example, the digital logic board 44 can format messages to be sent by the communications module 34 according to instructions from the control system 32. Similarly, the digital logic board 44 can reformat received messages into a form acceptable at the control system 32. This can include filtering and demodulating the messages, as well as other known signal processing techniques. The digital logic board 44 is also responsible for the conversion of data between analog and digital formats, where it is necessary. Thus, the digital logic board 44 can include either or both of an analog-to-digital converter and a digital-to-analog converter.

The digital logic board 44 also comprises a global positioning system (GPS) module 45. The GPS module 45 provides position information to be included in broadcast messages. For example, in a battlefield implementation of the personal digital assistant 30, one of the predetermined messages available for user selection can be a request for evacuation and medical assistance. The GPS module 45 can provide location information for the requesting unit, so the information can be automatically included in the call for assistance. In addition, the location information for the unit will be automatically broadcast to other personal digital assistants (not shown) over a tactical network at periodic intervals.

The IF board 46 contains a variety of circuitry associated with the operation of the communications module 34. For example, the RF board 46 can include frequency tuning circuitry for upmixing signals from the digital logic board 44 for transmission and for downmixing received signals to appropriate frequencies for processing. The IF board 46 can further include appropriate filtering and amplifiers for transmitting a desired signal or for receiving a broadcast RF signal. In an exemplary implementation, the IF board 46 can include appropriate shielding to prevent interference with the processing by external electrical and magnetic fields. For example, a Faraday cage may encompass portions of the IF board.

Messages from the IF board are provided to the amplifier assembly 47. The amplifier assembly provides high power amplification to outgoing messages and provides them to an antenna 48. The antenna 48 can be an integral part of the personal digital assistant 30, but in an exemplary implementation, that antenna is removable to retain the compactness of the personal digital assistant. The antenna 48 can be capable of receiving signals of multiple frequencies, including L-band transmissions and global positioning signals. The antenna can assume any of a number of configurations designed to enable long-range transmission of RF signals at minimal power. In an example implementation, the antenna has a helical configuration stretching over a length of approximately four inches. Messages received at the antenna 48 are provided to the amplifier assembly 47 where they are amplifier at a low noise amplifier (not shown). The amplified messages are provided to the IF board 46 for further processing.

An input/output conversion card 52 regulates the logic and power connections between the control module 32 and the communications module 34. For example, the input/output conversion card 52 can regulate a power supply voltage to the communications module 34 via a DC-to-DC converter that produces an appropriate supply voltage from a power supply 54 associated with the control module 32. The input/output conversion card 52 can also regulate the logic level of signals passing between the control module 32 and the communications module 34. For example, where the control module 32 and the communications module 34 operate at different voltages, the input/output conversion card 52 can comprise a voltage regulator for converting a programmable logic signal at a first characteristic voltage into a programmable logic signal at a second characteristic voltage.

Figure 3:
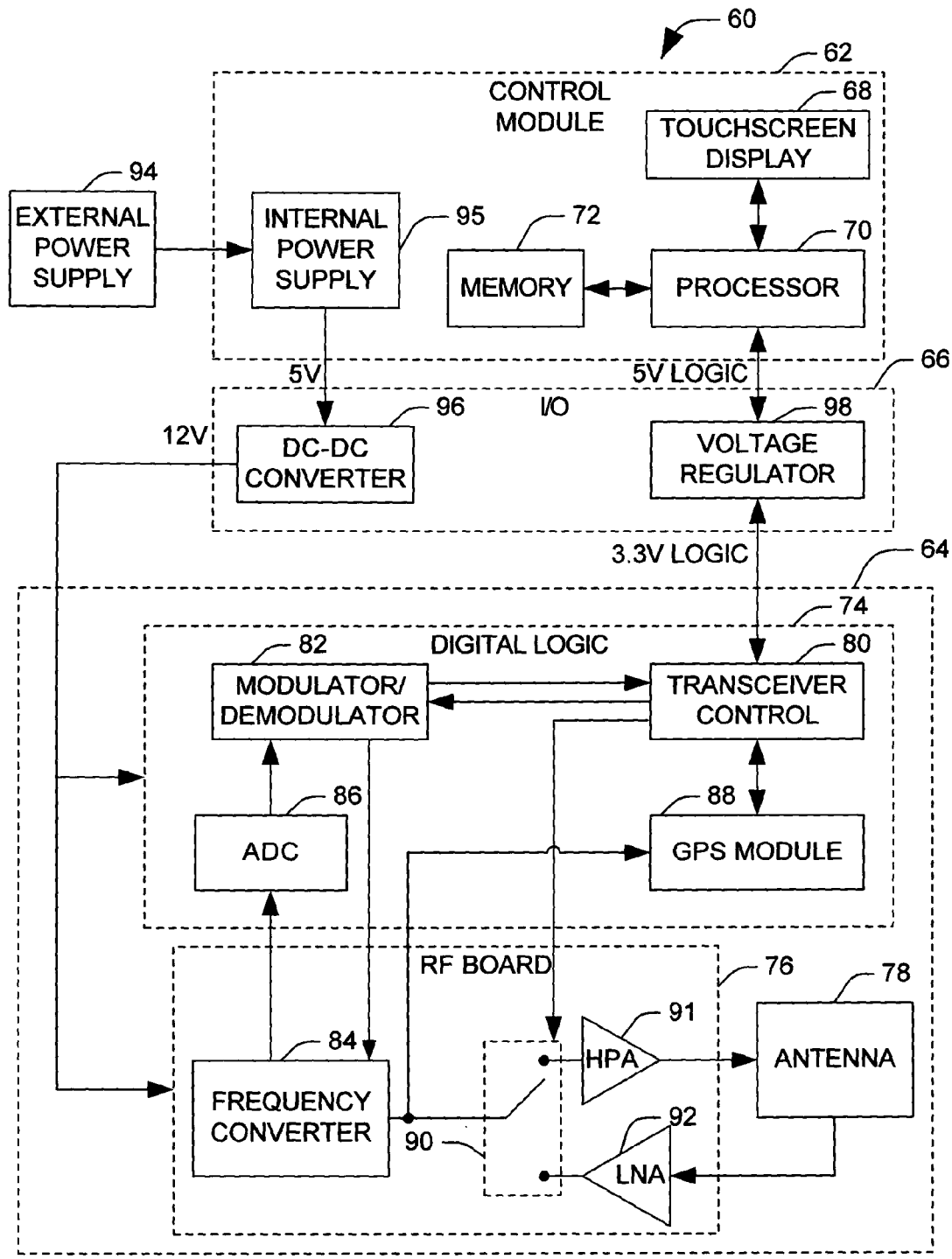
FIG. 3 illustrates a schematic block diagram of an exemplary implementation of a personal digital assistant as part of a battlefield tactical network in accordance with an aspect of the present invention.

FIG. 3 illustrates an exemplary implementation of a personal digital assistant 60 in accordance with an aspect of the present invention. In the exemplary implementation, the personal digital assistant 60 is part of a battlefield tactical network that shares location information among a plurality of personal digital assistants. It will be appreciated, however, that the personal digital assistant of the present invention is not limited to this use and can be used in a variety of applications requiring compact communications and navigation devices. The personal digital assistant 60 includes a control module 62 that processes information to display to a user and receives user input, a transceiver 64 that allows the personal digital assistant 60 to communicate with one or more other communications devices, and an input/output board 66 that regulates power and logic connections between the control module 62 and the transceiver 64.

In an exemplary embodiment, the control module 62 is part of a personal digital assistant (PDA) adapted to provide control logic to the transceiver 64. These adaptations can include providing the personal digital assistant with additional control software as well as physical changes. For example, a connection to a power supply associated with the PDA may be provided through a serial port in the PDA to power the transceiver 64.

The control module 62 includes a display 68 that provides information to a user. In the exemplary implementation, the display 68 is a touch sensitive transflective display that doubles as a touchscreen input for the PDA 60. A processor 70 receives communication requests as input from the display 68 and encodes each request as a message readable by the transceiver 64. The processor 70 then provides the encoded request to the transceiver 64 through the input/output board 66.

The processor 70 also generates a map image on the display 68 based on data stored in a memory 72 and messages received at the transceiver 64. The memory 72 will include geographic data concerning an area of interest and the locations of various items of interest, such as terrain features and other landmarks. The memory 72 can be periodically updated to reflect information received at the transceiver 64, such as position updates from other PDA units and SPOT reports giving the location of enemy units. The user can manipulate the displayed map using various commands on the touchscreen display.

The transceiver 64 comprises a digital board 74, an RF board 76, and an antenna 78. The digital board 74 includes a transceiver control 80 that handles network protocol for communications with the tactical network. The transceiver control 80 also provides an application-programming interface to external applications. The digital board 74 further comprises a modulator/demodulator 82 that translates between the baseband signal associated with the transceiver control 80 and the intermediate frequency associated with the a frequency converter 84 on the RF board 76.

In an exemplary embodiment, the modulator/demodulator 82 comprises a field programmable gate array (FPGA) configured to provide the acquisition of a forward channel from the tactical network and to track the signal within that channel. After acquiring and tracking the signal from the forward channel, the FPGA decodes the forward error correction information coded into the data and provides the signal information to the transceiver control 80 for further processing. When the personal digital assistant 60 is transmitting information, the FPGA receives encoded network layer bits from the processor, provides link and physical layer processing, and produces an intermediate frequency signal. The intermediate frequency signal is then provided to the RF board 76 for upconversion and transmission.

An analog-to-digital converter 86 is provided to digitally sample incoming signals and provide the samples to the modulator/demodulator 82. The digital board further includes a GPS module 88 that determines the location of the device upon a command from the processor 70. In an exemplary embodiment, the GPS module 88 receives radio frequency input directly from the RF board 74 via a coaxial connector split off from the signal path. The present location of the PDA 60 can be determined from this input as is known in the art. The generated location information is made available to the transceiver control 80 for inclusion in outgoing location update messages to the tactical network.

The RF board comprises a frequency converter 84 and a switch 90 that switches the RF board between a transmit and a receive state. When the personal digital assistant 60 is transmitting information, the frequency converter 84 upconverts a modulated intermediate frequency signal provided by the modulator/demodulator 82 to a radio frequency and provides it to a high power amplifier 91 via the switch 90. The amplified signal is then provided to the antenna 78 for transmission. In an exemplary embodiment, the antenna 78 is a detachable quadrifilar helix antenna operative to receive both L-band frequencies and one or more frequencies associated with global position systems (e.g., L1 and L2). When the personal digital assistant 60 is receiving information, a signal is received at the antenna 78 and amplified at a low noise amplifier 92. The amplified radio frequency signal is passed through the switch 90 to the frequency converter 84 for down conversion to an intermediate frequency. In an exemplary embodiment, the components of the RF board are enclosed in a Faraday cage (not shown) to reduce electromagnetic interference with the transmitted and received RF signals.

The transceiver 64 is powered by an external power supply 94 and an internal power supply 95 associated with the control module 62. In an exemplary embodiment, the external power supply 94 comprises a five-volt battery mounted to the exterior of the transceiver 64, and the internal power supply 95 comprises a smaller, rechargeable five-volt battery. This voltage is provided to a DC-to-DC converter 96 on the I/O board 66, which converts the voltage to a necessary voltage for the transceiver 64. In an exemplary embodiment, the transceiver requires a power supply within a range of about ten to about fourteen and a half volts, and the DC-to-DC converter 96 provides a twelve-volt supply to the transceiver 64. The specific voltage levels experienced by the DC-to-DC converter can be adjusted according to the respective power requirements of the control module 62 and the transceiver 64.

The I/O board 66 further includes a voltage regulator 98 that standardizes the voltage level of the logic signals passing between the control module 62 and the transceiver 64. In an exemplary embodiment, the control module 62 operates at a voltage of about five volts, but the transceiver requires logic signals at about 3.3 volts. The voltage regulator 98 converts the five-volt logic of the control module into the 3.3 volt logic appropriate for the transceiver. In an exemplary embodiment, the transceiver 64 can be adapted to accept logic signals at the same voltage as the control module 62, rendering the voltage regulator unnecessary.

Figure 4:
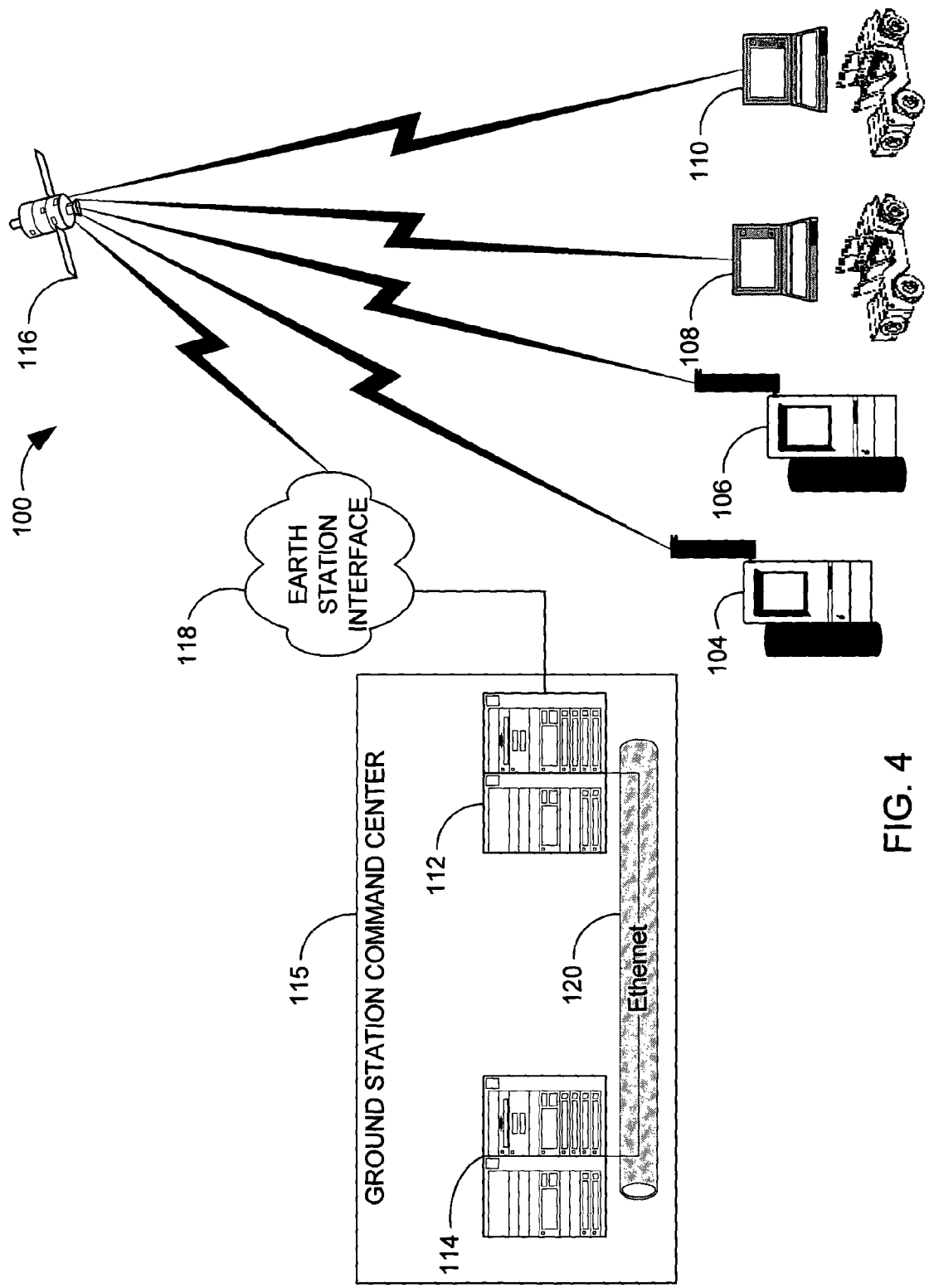
FIG. 4 illustrates an exemplary battlefield tactical communications system in accordance with one or more aspects of the present invention.

FIG. 4 illustrates an exemplary battlefield tactical communications system 100 in accordance with one or more aspects of the present invention. The battlefield tactical network 100 includes a plurality of personal digital assistants 104-108, carried by dismounted soldiers, in accordance with an aspect of the present invention. The personal digital assistants 104 and 106 are operative to communicate with one another wirelessly, and are adapted to transmit and receive text messages and location information to and from other personal digital assistants 104-108, portable communications consoles 108 and 110 in vehicle units 110, stationary computers 112 and 114 within a ground station command center 115, and other friendly communications devices within the tactical communications system. The battlefield tactical network 100 facilitates transmissions between communications devices 104-114 at reduced power requirements, thus extending the useful life of batteries in the units while also reducing the size and weight of batteries required.

The battlefield tactical network 100 further comprises one or more satellites (e.g., 116) arranged to transmit and receive messages over a predetermined coverage area of the system 100. The satellites 116 are operative to receive transmissions from the mobile personal digital assistants (e.g., 104) and to re-broadcast the transmissions at the same or boosted power levels to other personal digital assistants (e.g., 106) within the coverage area. Signals can be relayed within the communications network to communicate with other, more distant, communication devices. For example, signals from a satellite (e.g., 116) can be received at an earth based station interface 118 and provided to a first stationary computer unit 112. A land-based Ethernet connection 120 can be provided to carry signals to a second stationary computer unit outside of the coverage area of the satellite relays (e.g., 116).

In one example, a location update message is provided by a personal digital assistant 104. The message contains a geographic location, expressed in a standard set of coordinates, a unique identification string for the personal digital assistant 104, and any necessary error coding or routing information. Any of a variety of encryption mechanisms (e.g., hashing, key pairs) can be employed to encrypt the message for security purposes. The personal digital assistants (e.g., 104) can be programmed to frequency hop according to a predefined frequency-hopping scheme over N number of channels, N being an integer. The personal digital assistant 104 produces a modulated analog signal containing the location update message that is transmitted to all members of the system (e.g., 106-114). More particularly, the analog signal is sent to and re-broadcasts by a satellite 116 at increased power levels so as to reach the other units within the coverage area. The satellite 116 can be a repeater such that the mobile base simply re-broadcasts the transmission. Alternatively, the satellite 116 can be a router that provides intelligent routing to specific destination devices.

The relayed signal is received at one or more personal digital assistants (e.g., 106) or other communications devices (e.g., 110) within the tactical network. At each receiving personal digital assistant (e.g., 106), the signal is processed to produce updated position data for the transmitting personal digital assistant 104. This processing can include filtering and demodulating the signal, as well as decrypting the transmitted location update message and identifying the originating personal digital assistant. Once it has been extracted from the received signal, the location update message is stored in memory and provided to a processor within the personal digital assistant (e.g., 106). The processor provides appropriate input to an associated display to update the position of the originating personal digital assistant 104.

Figure 5:
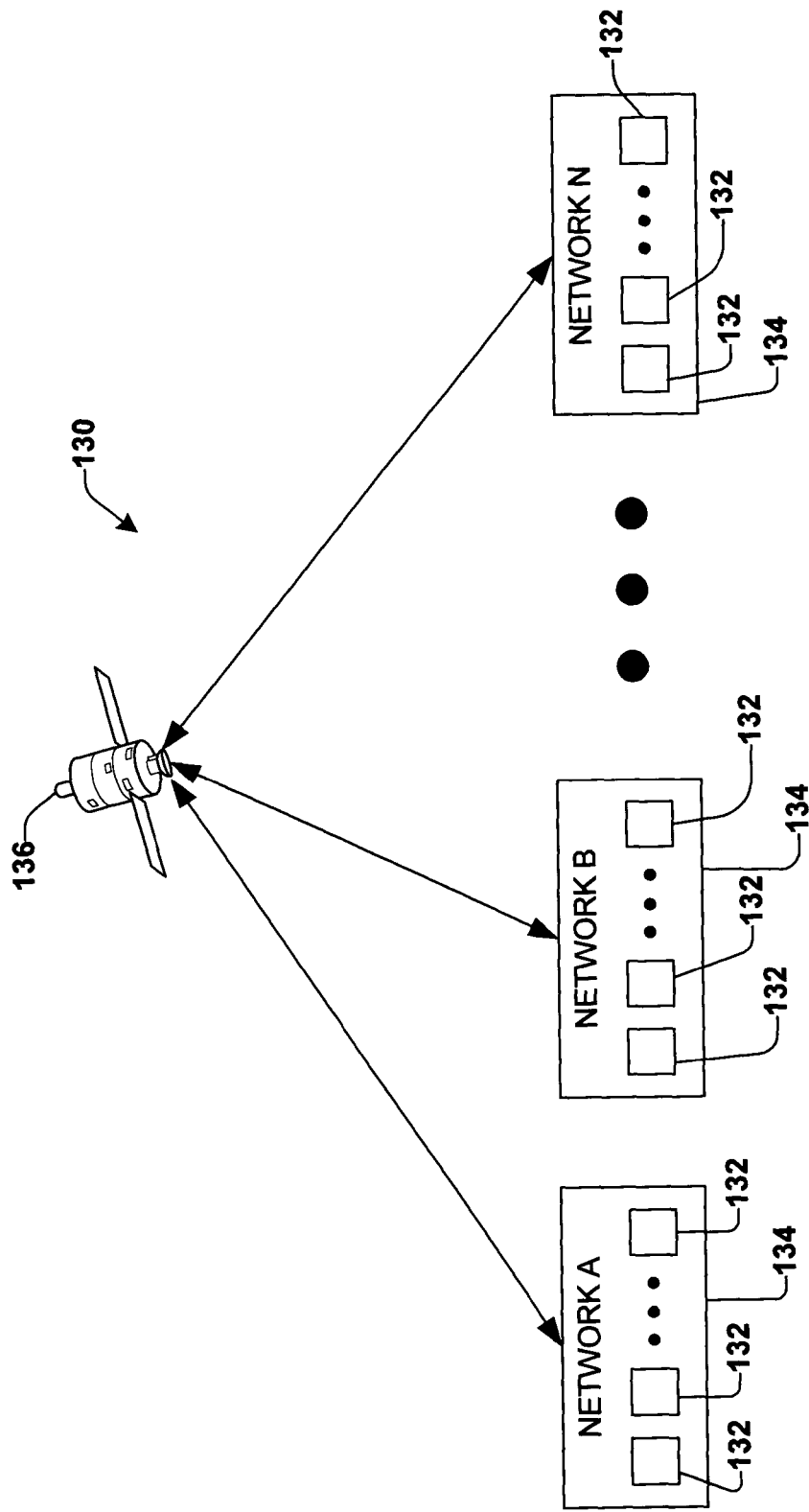
FIG. 5 illustrates a network of personal digital assistants divided into logical networks in accordance with one or more aspects of the present invention.

FIG. 5 illustrates a network 130 of personal digital assistants 132 divided into logical networks in accordance with one or more aspects of the present invention. As part of the establishment of these logical networks 134, personnel belonging to different mission teams can be provided with personal digital assistants having varying configurations. For example, an individual assigned to a mission in a particular location can be given PDA software specific to that location and an associated mission team. In particular, the PDA software can contain specific geographic data corresponding to the location and routing information indicating the individual's status as part of the mission team.

By changing routing information associated with the PDA software, the PDAs 132 can be configured to operate in respective logical networks A thru N (where N is an integer). For example, network A can represent a first mission team, network B can represent a second mission team, network C can represent command and administrative personnel, and so forth. A transmission from any PDA 132 will be encoded with routing information indicating the intended logical network for reception. This can reduce the amount of irrelevant messages received at each PDA 132, allowing the user to concentrate on the messages necessary for an assigned task.

While all PDAs within a mission team will generally communicate using the same general protocols, it will occasionally be desirable to communicate to units outside of its own logical network. For example, the units responsible for evacuating a wounded solider form a battlefield may be part of a different logical network 134. These other logical networks may utilize a different encoding protocol or encryption scheme. The router within the satellite relay 136 can be programmed to decrypt and/or decipher data in one protocol and provide the message to the desired network in a second protocol. The router also extracts routing information from the message and transmits the message to specific devices 132 in a desired logical network 134. Data can be queued in the satellite relay 136 for transmission according to priority over multiple logical networks. For instance, text messages can have priority over routine location updates. Alert messages can take priority over all other messages. Additionally, task and member priority information can provide membership priority. For example, certain members (e.g., leaders) have priority over other members (e.g., general members), such that their text messages should be transmitted as a priority over other members.

Figure 6:
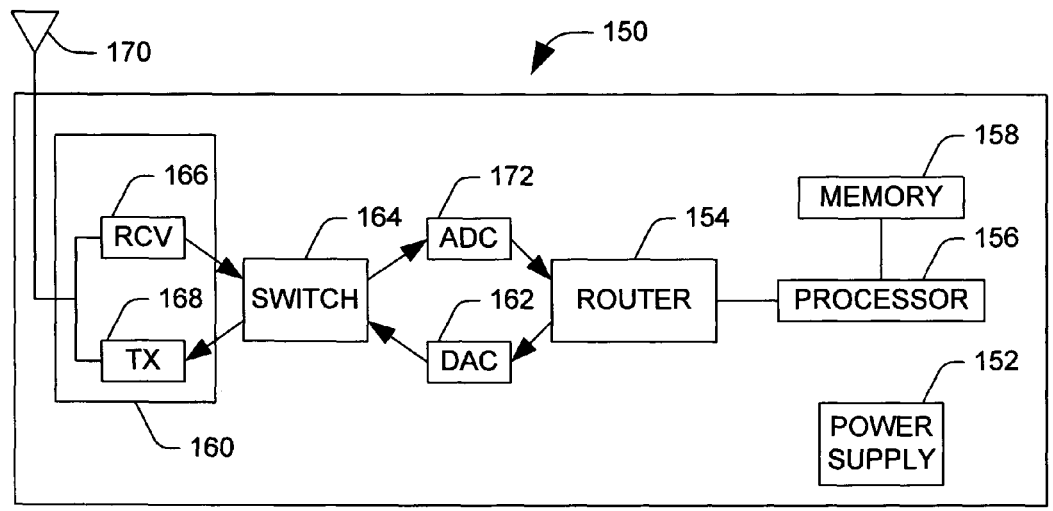
FIG. 6 illustrates a block diagram of an exemplary satellite relay according to one or more aspects of the present invention.

FIG. 6 illustrates a block diagram of an exemplary satellite relay 150 according to one or more further aspects of the present invention. The satellite relay 150 includes a power supply 152 for providing power to the satellite relay 150. The satellite relay 150 also includes a router 154 that facilitates communications between one or more personal digital assistants or other friendly transmitters (e.g., vehicle mounted communication units). The router 154 processes messages (e.g., text, location updates) received from personal digital assistants, and routes the messages to one or more other personal digital assistants or other friendly receivers. The satellite relay 150 includes a processor 156 coupled to a memory 158 and the router 154. The processor 156 can be programmed to control and operate the various components within the satellite relay 150. Additionally, the processor 156 can be programmed to receive requests from the units, such as providing a home station with updated location information and emergency alert notifications.

The router 154 transmits communications to a radio component 160 through a digital-to-analog converter (D/A) 162. The radio component 160 is coupled to a transmit and receive radio frequency (TX/RX RF) switch 164 which selects between transmitting and receiving communications by a transmitter 166 and a receiver 168, respectively, via one or more antennas 170. The router 154 receives communications (e.g., location data, text messages) through the antenna 170, receiver 168, switch 164 and an analog-to-digital converter (A/D) 172. The analog-to-digital converter (A/D) 172 converts a received analog message into a digitized packet of data. The router 154 then processes the digitized packet of data (e.g., via the processor 156).

Figure 7:
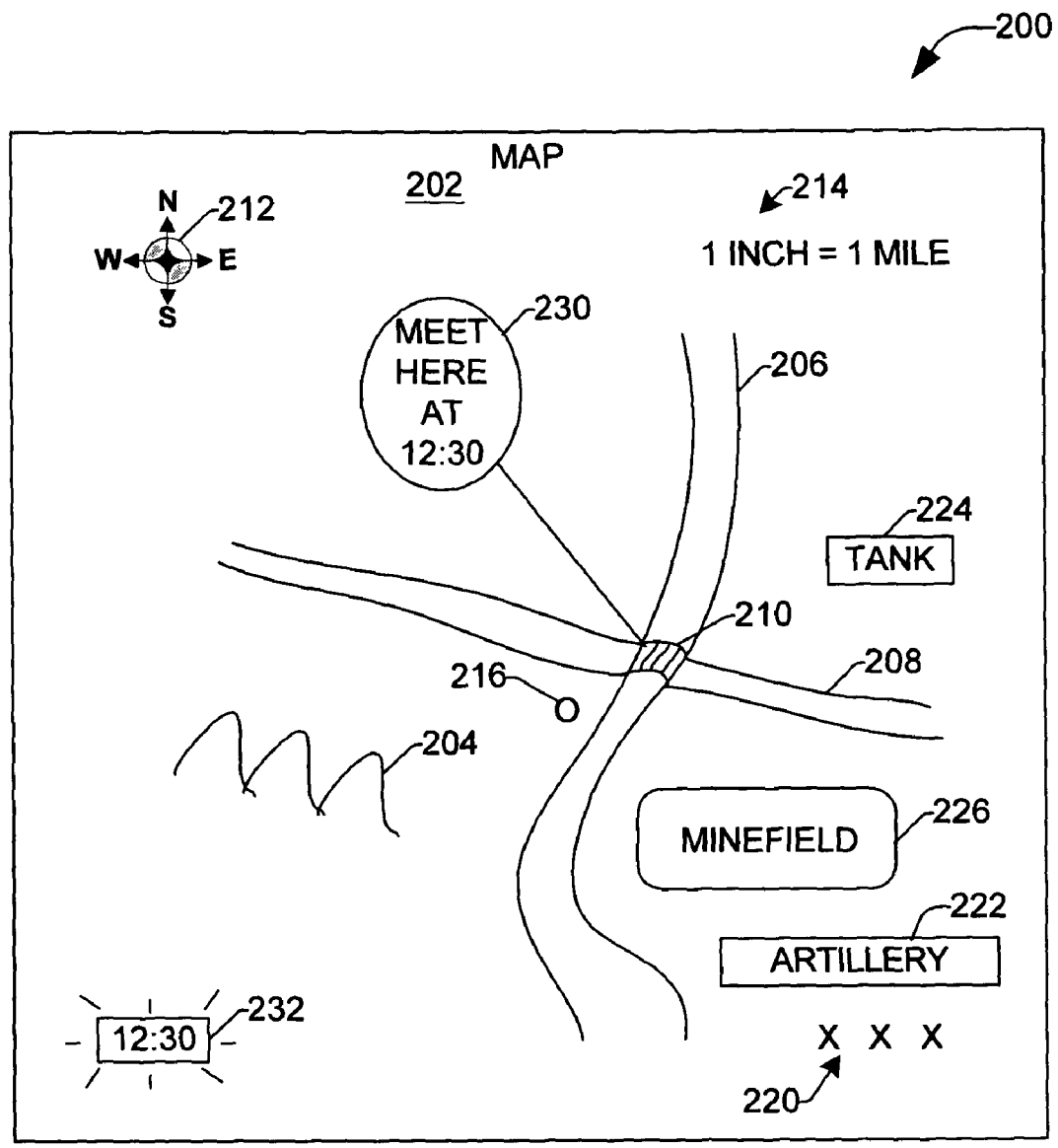
FIG. 7 illustrates an exemplary display from a personal digital assistant in accordance with one or more aspects of the present invention.

FIG. 7 illustrates an exemplary display 200 from a personal digital assistant in accordance with one or more aspects of the present invention. A map 202 of an area may include elements of the terrain, such as mountains 204, rivers 206, roads 208, bridges 210, etc. The map 202 may also include a compass 212 and a legend 214 to assist with reading the map. The personal digital assistant system memory can include location information (e.g., longitude, latitude) and input from a global positioning module to allow the various elements of terrain to be presented on the map relative to the position 216 of the personal digital assistant.

Other items of interest may also be represented on the map on the personal digital assistant. For instance, where the personal digital assistant is utilized in the context of military operations, the positions of friendly and enemy infantry 220, artillery 222, tanks 224, minefields 226, and other military units may be shown on the map. The respective locations of friendly units can be provided, for example, via periodic updates to the personal digital assistant. Similarly, the respective locations of enemy units can be determined by friendly ground units which can spot the items and utilize some type of range finder (e.g., hand-held laser beam range finder) to determine the distance of the enemy units from their position. Alternatively, location information can be entered manually as an estimate of the location of items such as tanks and minefields. These items can then be provided on the map at appropriate distances from the friendly units GPS determined position.

Rendezvous times and coordinates (e.g., corresponding to the location of a bridge 210) can be communicated from a central command through a mobile base to one or more of the personal digital assistants to facilitate an evacuation mission for medical or other reasons. The message can be presented as an email, or as a command-and control update on the map as an indication of where and when to meet 230. A time display 232 on the map may flash and/or an alarm may sound when it is time to meet. A clock may also count down the time remaining until a scheduled rendezvous and sound an alarm at a predetermined period before hand. Having the ability to view the surrounding topography assists soldiers in choosing a suitable route to the rendezvous point. Broadcasting this information through the tactical communications network, instead of relaying it through other ground units, mitigates the possibility that some soldiers will not get the message due to line-of-sight constraints (e.g., mountains 204).

Figure 8:
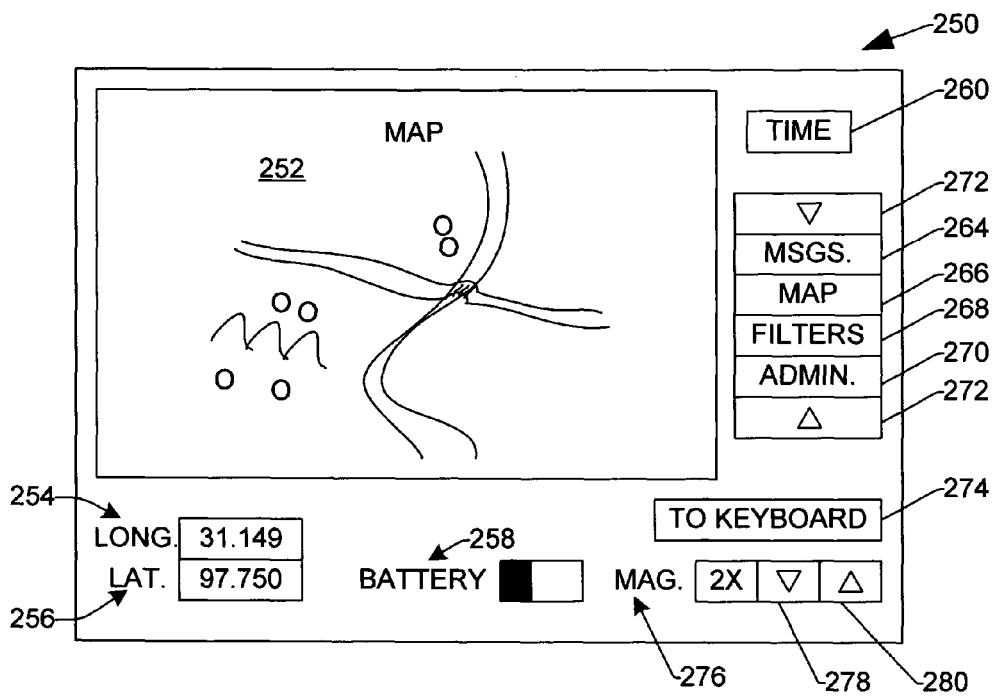
FIG. 8 illustrates an exemplary touchscreen display for a mapping function of a personal digital assistant in accordance with one or more aspects of the present invention.

FIG. 8 illustrates an exemplary touchscreen display 250 for a mapping function of a personal digital assistant in accordance with one or more aspects of the present invention. A map section 252 is included to show a map, such as that depicted in FIG. 10. The screen also includes the global position (e.g., longitude 254, latitude 256) of the unit, battery status 258 and the current time 260. Touchscreen buttons are provided to enable a user to choose particular functionalities (e.g., messaging 264, mapping 266, filtering 268, administrative 270), and scroll buttons 272 are included to allow a user to get to additional functionalities. A keyboard button 274 is included to facilitate text/alphanumeric entry through the touch screen. A magnification control 276 is included to enable a user to zoom in or out on an area of the map (e.g., down arrows 278, up arrows 280).

Figure 9:
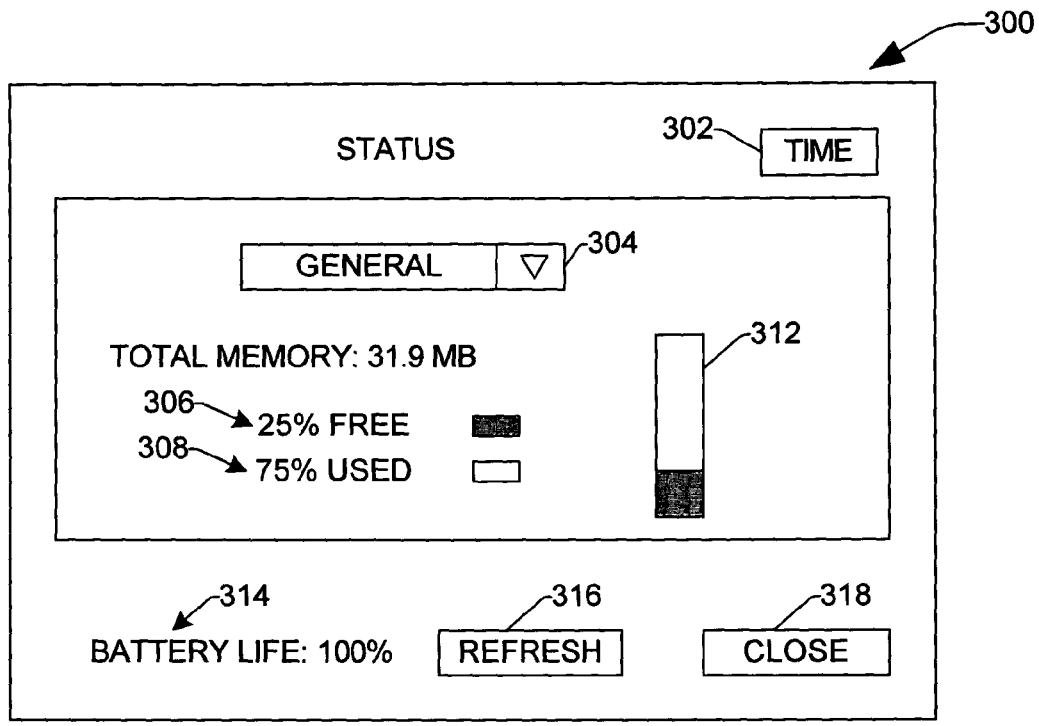
FIG. 9 illustrates an exemplary touchscreen display for checking the status of a personal digital assistant in accordance with one or more aspects of the present invention.

FIG. 9 illustrates an example of a touchscreen display 300 for checking the status of a personal digital assistant in accordance with one or more aspects of the present invention. The time 302 is displayed, as is a drop down menu 304 allowing a user to choose the type of status to be examined. In the general status window illustrated, the amount of memory available 306 and the amount of memory used 308 is shown (both graphically 312 and textually 306, 308), as is the charge remaining on the battery 314. Refresh 316 and close 318 buttons are included to allow a user to periodically view an updated status of the unit and to close out of this screen, respectively.

Figure 10:
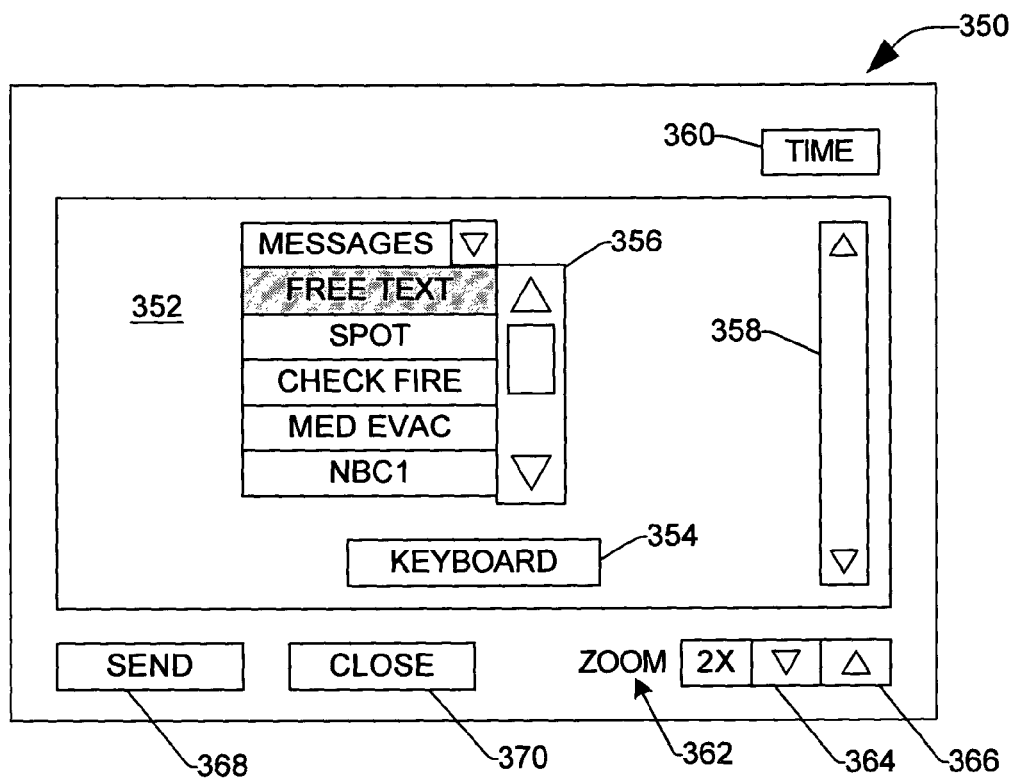
FIG. 10 illustrates an example of a touchscreen display for entering a text message into a personal digital assistant in accordance with one or more aspects of the present invention.

FIG. 10 illustrates an example of a touchscreen display 350 for entering a text message into a personal digital assistant in accordance with one or more aspects of the present invention. A text area 352 is included wherein entered text appears and wherein a keyboard 354 is represented, such as may be implemented via a touch screen. A drop down menu 356 allows a user to choose from a list of entry options (e.g., text, numeric, alphanumeric). These entry options can include a number of preset messages. For example, the NBC1 option can be used to instantly send a message indicating the presence of nuclear, biological, or chemical weapons along with a location obtained from the GPS module. Similarly, the SPOT option allows for automated reporting of the location of enemy troops. In an exemplary embodiment, the type (e.g., artillery, infantry, etc.) and approximate number of the enemy troops can be entered at a menu along with an estimate of their location. The Medical Evacuation and Check Fire commands work similarly, broadcasting a request for assistance from the user with location data for the PDA.

When a preset message is not appropriate for a particular situation, a user can select the free text entry as an option. When entering free text, a scroll bar 358 allows a user to scroll through entered text. The time 360 is displayed, as is a magnification option 362 allowing a user to zoom in or out of entered text (e.g., down arrows 364, up arrows 366). Send 368 and close 370 buttons are included to enable a user to send a composed message or to exit out of this screen, respectively. It is to be appreciated that the information presented in FIGS. 8-10 is exemplary only, and that more or less information could be presented on the same or different screens in similar or different manners.

Figure 11:
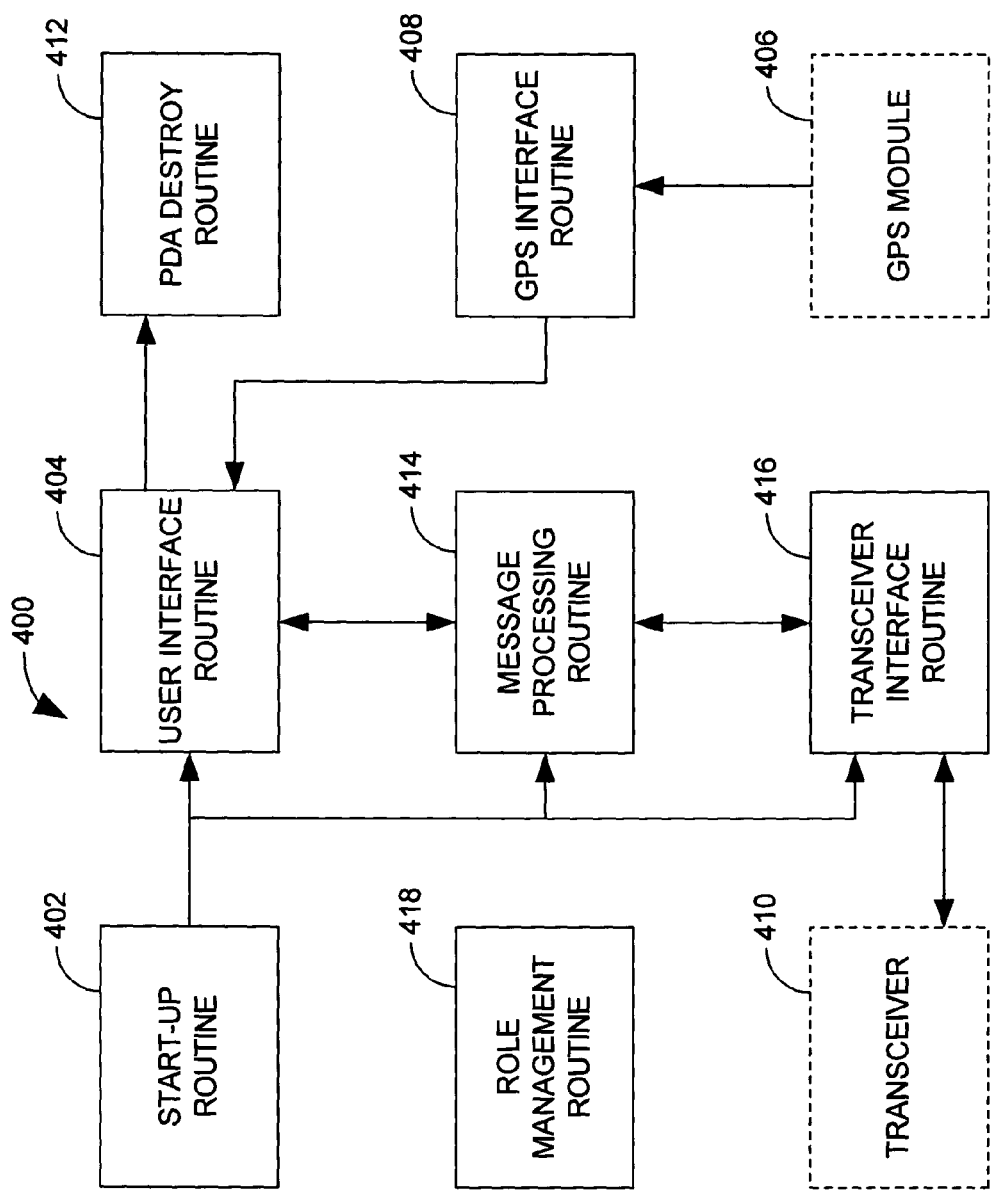
FIG. 11 illustrates software architecture for an exemplary navigation and tracking program operative on a personal digital assistant in accordance with one or more aspects of the present invention.

FIG. 11 illustrates software architecture 400 for an exemplary navigation and tracking program operative on a personal digital assistant in accordance with one or more aspects of the present invention. It will be appreciated that the illustrated software architecture 400 operates in conjunction with a standard operating system designed for use in a mobile computing environment. Accordingly, the various functions performed by the described software can include functions or routines provided with the operating system. For example, the operating system can provide routines for accepting input at an input device. In an exemplary implementation, the software architecture operates in conjunction with a Windows CE operating system. Among other functions, the Windows CE operating system provides device drivers for the various input devices in the PDA, network protocols, and general object handling protocols.

A start-up routine 402 initializes the software architecture 400 when the navigation and tracking software is started. The start-up routine 402 can be called as part of the overall start-up process of the PDA operating system, such that the navigation and tracking software is initiated upon powering up the PDA. The start-up routine 402 can reset all objects and classes associated with the software architecture to an appropriate initial state and prepare a location associated with a working memory within the PDA to receive location data and text messages. The start-up routine 402 can include a start-up sequence of commands, such as a command to display a amp screen within the PDA at a particular level of detail, broadcast a location update giving the present position of the PDA, and update the location of the PDA on the map.

A user interface routine 404 formats data from other software routines within the architecture 400 to be shown on a display (not shown). For example, location data associated with the PDA can be obtained via a GPS module 406 on the PDA. A PDA interface routine 408 interprets the GPS module 406 and provides the data to the user interface routine 404 in a usable form. The GPS interface routine 408 also drives the GPS module 406 periodically to produce updated location data according to a predetermined update schedule. The user interface routine 404 is responsive to commands from an input device, such as a touchscreen keypad. This can include commands to adjust the display of data, to generate a message for an associated transceiver 410, or to initiate a PDA destroy routine 412 that completely erases and destroys the device memory.

The PDA can contain security protocols besides the memory destruction of the PDA destroy routine 412. For example, the PDA can include remote challenge protocols, remote lockout protocols, remote memory destruction, and remote re-keying of the L-band SATCOM transceiver from a central station.

When a command is received requiring the broadcast of a message at the transceiver, the user interface routine 404 provides the command to a message processing routine 414. The message processing routine 414 generates an appropriate message according to the user command and provides the message to a transceiver interface routine 416. The message processing routine 414 can also generate automated messages according to a predetermined schedule. The generated message can include location data provided from the user interface process 404 as well as appropriate encryption. Where a message is received at the PDA, the message processing routine 414 decrypts the message, logs it to a memory, and assigns a time and date stamp to the message. Any text or position data provided within the message is then extracted and provided to the user interface routine 404 to be displayed to the user.

The transceiver interface routine 416 interfaces with the control circuitry of the transceiver 410 to drive the processor to broadcast messages from the message processing routine 414. The transceiver interface routine 416 can drive the transceiver 410 to error code a message and modulate to a radio frequency signal. The message is then amplified and broadcast over an associated antenna. The transceiver interface routine 416 also oversees the demodulation and error checking of messages received at the transceiver 410. Once the message is demodulated and checked for error, it is passed to the message processing routine 414.

A role management routine 418 regulates the access of the PDA to resources on the server. In an exemplary battlefield application, the role management routine 418 can limit user access to received messages and position updates according to the status or rank of the user, his or her mission team status, and any other special status (e.g., medical personnel) that the user may possess. For example, location updates for sensitive military units might only be provided to personnel above a particular military rank to mitigate against the possibility of its capture. The role management routine 418 can also work to protect the PDA itself against unauthorized access via a password function or one or more biometric devices (e.g., a fingerprint scanner).

Figure 12:
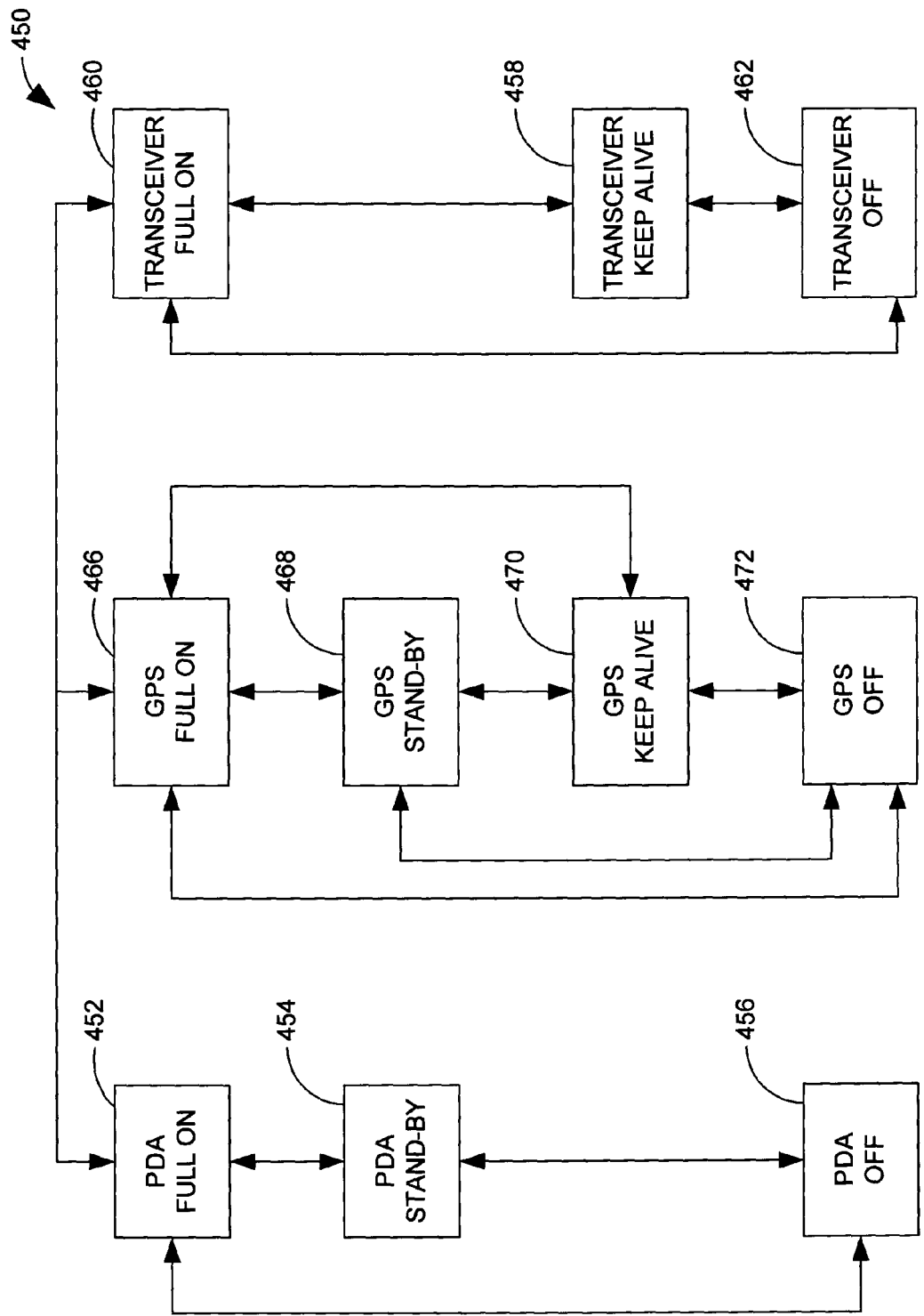
FIG. 12 illustrates power management states of an exemplary personal digital assistant in accordance with one aspect of the present invention.

FIG. 12 illustrates the high-level power management states 450 of an exemplary personal digital assistant in accordance with one aspect of the present invention. Extending the effective battery life of the PDA to useful levels requires careful management of power resources within the PDA, the transceiver, and the GPS module. Accordingly, each of the PDA, the transceiver, and the GPS module can be controlled by one or more customized software applications running at the PDA or the digital board to alternate between various states of activity and power consumption.

The transitions between the various stages instigated by one or more conditions required by the control software. For example, the software can transition the PDA to a state of lower power consumption, such as a blank display condition, when it has not received input from a user for a predetermined period. The transitions can also be instigated directly by user input at a graphical user interface on the PDA. The graphical user interface can display an estimate of the remaining battery power for the device to guide the user in determining an appropriate power consumption state for the PDA, the transceiver, and the GPS module. The PDA can produce visual and audible alerts when the battery level reaches one or more predetermined levels.

Turning to the illustrated stages 450, when the PDA is displaying or receiving information, it remains in a PDA On mode 452. This is the mode of the highest power consumption for the PDA, and it provides full functionality to the user. In the On mode 452, the PDA can display geographical information and received location updates, receive additional location updates from the transceiver and the GPS module, and process message requests from the user.

When the PDA has been idle for a set period of time, the PDA will enter a Stand-by mode 454. In the PDA stand-by mode 454, the PDA will blank its display until it receives input the user. In an exemplary embodiment, the PDA can transition from Stand-by mode 454 to On mode 452 when it receives input from the GPS module, or the transceiver, providing an audible alter to the user that updated information is available.

The lowest power consumption stage for the PDA is the PDA Off mode 456. The Off mode 456 can be selected by a user or automatically selected after a predetermined idle period for the PDA. As the name would suggest, in the Off mode 456, the PDA cannot display or receive information or receive user input until it is restarted. Position updates and text messages received during the PDA Off mode will not be stored at the PDA, but in an exemplary embodiment, incoming messages can be cached at the transceiver control hardware until the PDA is reactivated.

The transceiver is also controlled by circuitry, and can be transitioned through its power management stages by control software at the transceiver as well as the PDA software. The transceiver generally remains within a Stay Alive mode 458 until it is necessary to receive or transmit data. In the Stay Alive mode 458, the transceiver consumes a minimal amount of power to monitor the antenna for incoming signals and to maintain memory in power sensitive applications within the transceiver control. The transceiver only transmits data at a user command and at predefined intervals, so the transceiver will generally spend a majority of its operation at the Stay Alive mode 458.

The transceiver is switched to an On mode 460 when it is actively transmitting and receiving data. This can be the result of user intervention (e.g., a message request) or automated processes within the control software of the PDA and the transceiver (e.g., a scheduled location update transmission). The transceiver can also be switched to an ON mode 460 in response to an incoming transmission. A transceiver off mode 462 can be selected by the user or by a control process for situations requiring extreme power conservation. While in the Off mode, the transceiver cannot send or receive messages and can lose queued data stored in memory within the transceiver control circuitry.

The GPS is controlled through the GPS power cycling software at the module and has three primary power modes 466, 468, and 470, as well as an Off mode 472. At a GPS On mode 466, the GPS has normal functionality. In other words, the GPS module determines the location of the PDA and provides this information to the PDA. The GPS module remains in a Stand-By mode 468 between periodic position updates. As it is only necessary to update the location data for the PDA information at periodic intervals (e.g., every 150 seconds), the GPS module In the Stand-by mode 468, the GPS module does not actively acquire position data, but maintains a ready state to conduct periodic updates of the device position.

The third power mode is a Keep Alive mode 470. The Keep Alive mode has the lowest power consumption of the three primary power modes. The Keep Alive mode provides enough power to retain data stored in nonvolatile memory, such as almanac data, cryptography parameters, operator entered data, the current time, the last recorded position, and similar data. In an exemplary embodiment, there is a timeout period in which the transceiver will switch to Keep Alive mode if no operator interaction has occurred in the GPS ON mode 466. Finally, a GPS off mode 472 can be selected by the user or by a GPS control process for situations requiring extreme power conservation. While in the Off mode 472, the GPS cannot send or receive messages and will lose any stored initialization data in memory.

Figure 13:
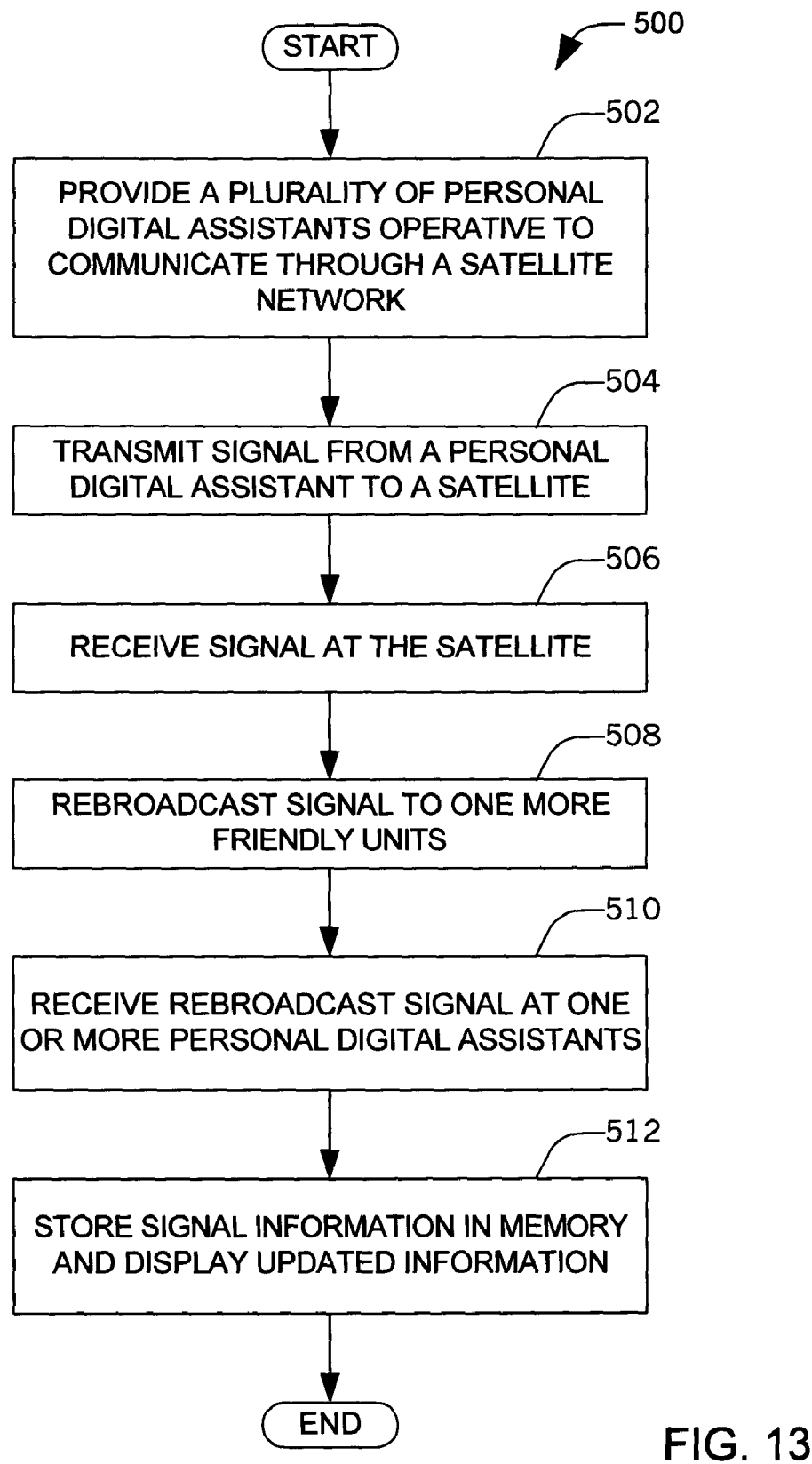
FIG. 13 illustrates an exemplary methodology for establishing a tactical communication system that communicates within a selected area using a plurality of personal digital assistants in accordance with an aspect of the present invention.
Figure 14:
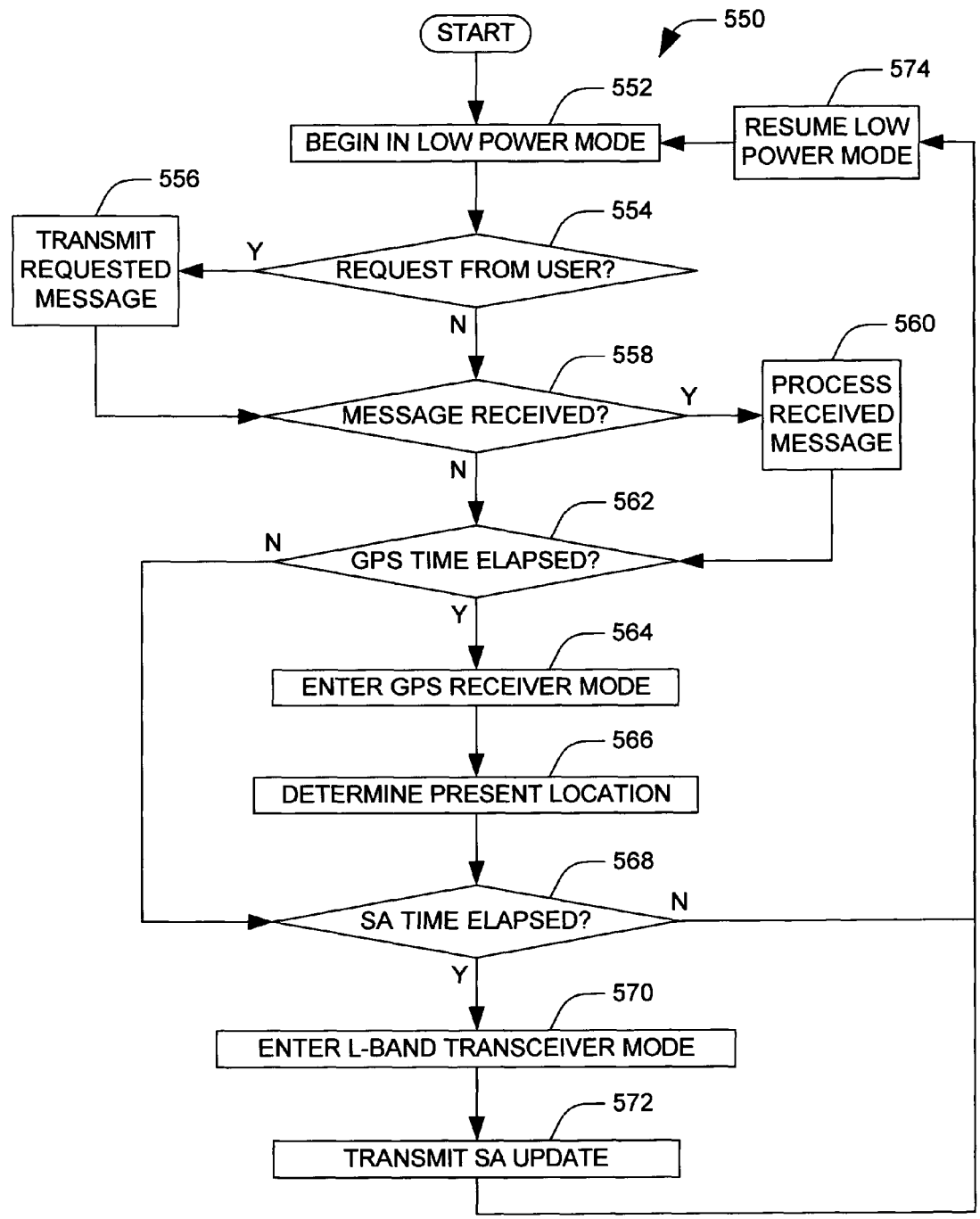
FIG. 14 illustrates an exemplary methodology for the operation of a personal digital assistant in accordance with one or more aspects of the present invention.

In view of the foregoing structural and functional features described above, methodologies in accordance with various aspects of the present invention will be better appreciated with reference to FIGS. 13-15. While, for purposes of simplicity of explanation, the methodologies of FIGS. 13-15 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 13 illustrates an exemplary methodology 500 for establishing a tactical communication system that communicates within a selected area using a plurality of personal digital assistants in accordance with an aspect of the present invention. The tactical communication system mitigates line-of-sight constraints between the plurality of personal digital assistants in accordance with an aspect of the present invention, without a significant increase in the size and weight of the personal digital assistants. The methodology begins at 502 wherein a plurality of personal digital assistants operative to communicate through a network of communications satellites station are provided to form a tactical communication system. The satellite network establishes a communication coverage area for the personal digital assistants.

Then, at 504, a personal digital assistant transmits a signal to a satellite within the satellite network. The signal can be a position update or a text message in accordance with the above-described aspects of the personal digital assistant of the present invention. At 506, the signal is received by the satellite and is rebroadcast to one or more other friendly communication units at 508. The friendly communication units can include personal digital assistants intended for dismounted units in accordance with the present invention, as well as larger tactical systems within vehicles and stationary encampments. The satellite can rebroadcast the message at a power level substantially larger than the message was received to increase the coverage area of the tactical communication system. At 510, the rebroadcast signal is received at one or more personal digital assistants. At 512, the information from the rebroadcast signal is stored in memory and a display on the unit is updated to reflect the new information. For example, if the signal represents a position update, the PDA memory will be changed to reflect the new position, and the position of the object will be moved relative to the map on the display. If the signal represents a text message, the message will be logged in the memory, and the message will be displayed across the display of the PDA.

FIG. 14 illustrates an exemplary methodology 550 for the operation of a personal digital assistant in accordance with one or more aspects of the present invention. The methodology 550 begins at 552, with the PDA in a low power, or sleep mode. The methodology continues at 554, where the PDA determines if a message request has been input by a user. For example, the user can request that the system send a preset message to all other units requesting assistance. If a request has been received, the PDA generates and broadcasts the requested message at 556. The methodology then proceeds to 558. If no request is received from the user, the methodology proceeds directly to 558.

At 558, the personal digital assistant determines if any incoming messages have been received. For example, a received message could be a position report updating the position of a friendly unit, a spot report giving the present location of an enemy unit, or a text message from another unit or a commander. If an incoming message has been received, the PDA processes the incoming messages at 560 and updates a memory and a display associated with the PDA to reflect the message data, and the methodology advances to 562. If no messages have been received, the methodology proceeds directly to 562.

At 562, the PDA determines if a first, predetermined interval of time has elapsed. At the end of this interval, the PDA updates its location information using a GPS module. In an exemplary embodiment, the first interval has a length of two and one-half minutes. If it is necessary to update the GPS location information, the PDA enters a GPS receiver mode at 564. In the GPS receiver mode, the PDA provides L1 and L2 signals received at the transceiver to a GPS module for analysis. The methodology then continues to 566, where the GPS analyzes the received signals to determine the present location of the PDA. This can be accomplished by any of a number of means known in the art. The methodology then advances to 568. If the first predetermined interval has not elapsed at 562, the methodology proceeds directly to 568.

At 568, the PDA determines if a second, predetermined interval of time interval has elapsed, indicating that a situational awareness message should be broadcast to other units in the area. In an exemplary embodiment, this second interval has a length of five minutes. If the second interval has elapsed, the methodology advances to 570, where the PDA enters an L-band transmission mode. At 572, the PDA broadcasts an L-band transmission to one or more friendly units through a satellite relay. This transmission will include the present position of the PDA. The methodology then advances to 574. If the second interval has not elapsed at 568, the methodology advances directly to 574. At 574, the PDA resumes a low power mode. The methodology then returns to 552 to await user input or an incoming message.

FIG. 15 illustrates an exemplary methodology 600 for adapting a personal digital assistant (PDA) to a form factor associated with a particular transceiver module in accordance with one or more aspects of the present invention. The methodology 600 begins at 602, where it is determined whether the logic voltage levels output by the PDA are compatible with the logic voltage levels of the transceiver module. For example, the PDA may provide logic signals at 3.3 volts, while the transceiver circuitry operates at five volts. If the voltage levels are not compatible, the methodology advances to 604, where a voltage regulator on an I/O board within the transceiver is adjusted to translate the PDA logic voltage into the standard logic voltage for the transceiver module. The methodology then proceeds to 606. If the logic voltage levels of the PDA and the transceiver module are already compatible, the methodology proceeds directly to 606.

At 606, it is determined if the voltage of a battery within the PDA is compatible with the transceiver form factor. In the exemplary embodiment, the transceiver circuitry requires a power supply voltage in a range from 10-14.4 volts. If the battery voltage of the PDA is not compatible with required power supply for the transceiver module, the methodology advances to 608, where a DC-to-DC converter is adjusted to accept the battery voltage of the PDA and output a standard power supply voltage for the transceiver module. The methodology then advances to 610. If the battery voltage of the PDA is already compatible with the required voltage for the transceiver, the methodology proceeds directly to 610.

At 610, the PDA is connected to an external power supply to add the additional power necessary to support the battery. In the exemplary embodiment, the external power supply takes the form of an external battery attached to the outside of the transceiver module. Once the battery within the PDA is connected to this external power supply, the transceiver module is connected to the PDA battery. The transceiver module thus receives power indirectly from the external power supply. The methodology proceeds to 612, where the PDA is operatively connected to the transceiver module at a data port. This connection allows logic signals to be exchanged between the PDA and the transceiver through the I/O board.

At 614, interface software specific to the transceiver module is loaded onto the PDA. The interface software contains appropriate drivers for interaction with the transceiver module and special routines for necessary communications functions of the PDA. For example, routines for receiving messages can be included, comprising functions specific to the tactical network such as decryption and error checking. The software can also include various user responsive functions. In an exemplary embodiment, the software may contain a routine for drawing location data from memory, generating an emergency evacuation message, and transmitting it at the transceiver in response to actuation of a touchscreen button on the PDA display.

For example, a commercial, of-the-shelf PDA, such as a Compaq iPAQ personal digital assistant can be adapted into a satellite capable personal digital assistant in accordance with an aspect of the present invention. Converting an existing PDA requires the addition of one or more new computer boards as part of a transceiver module and an antenna to interface with GPS and L-band communications satellites. In the exemplary embodiment, the transceiver module comprises three boards. The three boards include an IF transceiver board containing circuitry for L-band communications, an amplifier board that contains amplifiers necessary for transmitting and receiving L-band and GPS signals, and a digital board that includes a GPS module for determining the location of the PDA and control circuitry for the GPS module and the transceiver.

A major problem with incorporating additional boards is the accumulation of heat from the amplifiers and other digital components in the proximity of the heat sensitive control circuitry within the PDA. To combat the heat problem, an aluminum enclosure is added for additional cards. In addition to acting as a heat sink for the internal circuit cards, the enclosure provides both a mechanical interface for the transceiver module and support for the satellite antenna. The enclosure also acts as a Faraday cage, which shields the internal circuitry from unwanted electromagnetic interference (EMI) radiating from external devices and the PDA.

The PDA can be connected to the transceiver module through hardwired circuitry, or an expansion board which passes through filters installed in the lid of the Faraday cage. The design approach is modular, enabling quick replacement of damaged components, with minimal invasion to the PDA. Internal metal shielding with the Faraday cage provides additional protection to the IF and amplifier assemblies from both the PDA and other circuit boards within the transceiver module. The present design overcomes previous problems in isolating the interference caused by normal antenna radiation patterns and internal RF emissions, which previously had interfered with the proper functioning of the compact satellite communications devices.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communications module, configured to be mounted to a handheld communications device and operative to interface with the handheld computing device, the communications module comprising:
   a global positioning system that determines the location of the module relative to a standard set of coordinates; and
   an L-band transceiver, operative to transmit data directly to a satellite relay, that broadcasts the determined location at a frequency within the L-band of the electromagnetic spectrum and receives location data for at least one other communications module; and
   an electrically conductive enclosure that substantially encompasses the L-band transceiver and comprises a conductive back plate configured such that at least a portion of the handheld computing device can be mechanically mounted to the conductive back plate, the electrically conductive enclosure being operative to facilitate the dissipation of heat produced by the L-band transceiver and to shield the L-band transceiver from electromagnetic interference, such that the communications module can be connected to the handheld computing device and removed from the handheld computing device without substantial invasion of the handheld computing device.

2. The module of claim 1, further comprising a single antenna operative to transmit and receive signals at L-band frequencies and to transmit and receive signals at GPS frequencies.

3. The module of claim 2, the antenna comprising a single quadrifilar helix antenna.

4. The module of claim 1, the communications module further comprising an input/output board that translates communications between the communications module and the handheld computing device.

5. The module of claim 1, the handheld computing device comprising an internal power supply, the internal power supply being operatively connected to the communications module.

6. The module of claim 5, the portable communications device further comprising an external battery that is operatively connected to the internal power supply.

7. The communications module of claim 1, the back plate comprising at least one port configured to allow an exchange of data and power between the communications module and the handheld computing device.

8. The communications module of claim 1, the conductive back plate being configured to replace a back plate of the handheld computing device, and a remainder of the electrically conductive enclosure being separable from the back plate as to allow connection and disconnection of the L-band transceiver and global positioning system from the handheld computing device.

9. A communications package configured to adapt a handheld computing device for use in a situational awareness system, the communications package comprising:
   the communications module of claim 1; and
   a computer readable medium storing executable instructions, the executable instructions being configured such that, when loaded onto the handheld computing device, the handheld computing device is adapted to receive the location of the communications module from the global positioning system, receive location data for each of a plurality of other communications modules from the L-band transceiver control, and display the locations of each of the communications module and the plurality of other communications modules on a display associated with the handheld computing device.

10. The communications package of claim 9, the executable instructions being configured to decrypt location data received at the L-band transceiver.

11. The communications package of claim 9, the executable instructions being configured to regulate the power usage of each of the L-band transceiver, the global positioning system, and the handheld computing device.

* * * * *